(12) United States Patent
Sano et al.

(10) Patent No.: US 10,734,162 B2
(45) Date of Patent: Aug. 4, 2020

(54) CAPACITOR DEVICE

(71) Applicant: DENSO CORPORATION, Kariya, Aichi-pref. (JP)

(72) Inventors: Tomohisa Sano, Kariya (JP); Kentaro Hirose, Okazaki (JP); Yohei Imai, Aichi-gun (JP); Seido Araki, Nagakute (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/511,279

(22) Filed: Jul. 15, 2019

(65) Prior Publication Data

US 2020/0020485 A1 Jan. 16, 2020

(30) Foreign Application Priority Data

Jul. 13, 2018 (JP) ................ 2018-133586

(51) Int. Cl.
*H01G 4/40* (2006.01)
*H01G 4/224* (2006.01)
*H01G 4/258* (2006.01)
*H01G 4/38* (2006.01)
*H02M 7/5387* (2007.01)

(52) U.S. Cl.
CPC ............... *H01G 4/40* (2013.01); *H01G 4/224* (2013.01); *H01G 4/258* (2013.01); *H01G 4/38* (2013.01); *H02M 7/5387* (2013.01)

(58) Field of Classification Search
None
See application file for complete search history.

(56) References Cited

U.S. PATENT DOCUMENTS

| | | | | |
|---|---|---|---|---|
| 8,054,641 B2 * | 11/2011 | Onishi | ................ | H02M 7/003 361/752 |
| 9,692,295 B2 * | 6/2017 | Takemoto | ............... | H02M 1/44 |
| 9,866,127 B2 * | 1/2018 | Fukumasu | .............. | H02M 3/28 |
| 10,511,229 B2 * | 12/2019 | Hirashima | ........ | H02M 3/33507 |
| 2013/0021771 A1 * | 1/2013 | Goto | .................... | H05K 9/0037 361/816 |
| 2013/0100634 A1 * | 4/2013 | Okubo | ..................... | H01F 27/36 361/816 |
| 2018/0026520 A1 * | 1/2018 | Hirota | ..................... | H02M 1/14 363/21.01 |

FOREIGN PATENT DOCUMENTS

JP 2014-045035 A 3/2014

\* cited by examiner

*Primary Examiner* — Xanthia C Cunningham
(74) *Attorney, Agent, or Firm* — Oliff PLC

(57) ABSTRACT

To provide a capacitor device capable of preventing thermal interference between a filter capacitor and a plurality of smoothing capacitors. A capacitor device provided in an energization circuit between a power source and a semiconductor module as a power supply device includes a filter capacitor for removing a noise included in a current supplied from a power input terminal, a plurality of smoothing capacitors for smoothing a voltage, and a capacitor case that houses the filter capacitor and the plurality of smoothing capacitors, and a first gap between the filter capacitor and a smoothing capacitor provided at a position closest to the filter capacitor among the plurality of smoothing capacitors is configured to be larger than a second gap between two smoothing capacitors adjacent to each other among the plurality of smoothing capacitors.

8 Claims, 6 Drawing Sheets

CAPACITOR DEVICE

CROSS-REFERENCE TO RELATED APPLICATION

This application is based on and claims the benefit of priority from earlier Japanese Patent Application No. 2018-133586 filed Jul. 13, 2018, the description of which is incorporated herein by reference.

BACKGROUND

1. Technical Field

The present disclosure relates to capacitor devices.

2. Related Art

There is has been proposed a capacitor device constituting a power conversion device mounted on a vehicle, such as an electric vehicle and a hybrid vehicle. The capacitor device has a capacitor case that houses a filter capacitor and a smoothing capacitor including a plurality of capacitor elements. In the capacitor device, the filter capacitor removes a noise included in a DC current input from a power source, and the smoothing capacitor is configured to smooth a boosted DC voltage.

SUMMARY

The present disclosure provides a capacitor device. A capacitor device of the present disclosure is provided in an energization circuit between a power source and a power supply device. The capacitor device includes a filter capacitor, a plurality of smoothing capacitors, and a capacitor case. A first gap between the filter capacitor and a smoothing capacitor provided at a position closest to the filter capacitor among the plurality of smoothing capacitors is configured to be larger than a second gap between two smoothing capacitors adjacent to each other among the plurality of smoothing capacitors.

BRIEF DESCRIPTION OF THE DRAWINGS

In the accompanying drawings:

FIG. 3 is viewed along the direction of an arrow A of FIG. 3;

FIG. 3 is viewed along the direction of an arrow B of FIG. 3.

DETAILED DESCRIPTION OF THE PREFERRED EMBODIMENTS

Figure 1:
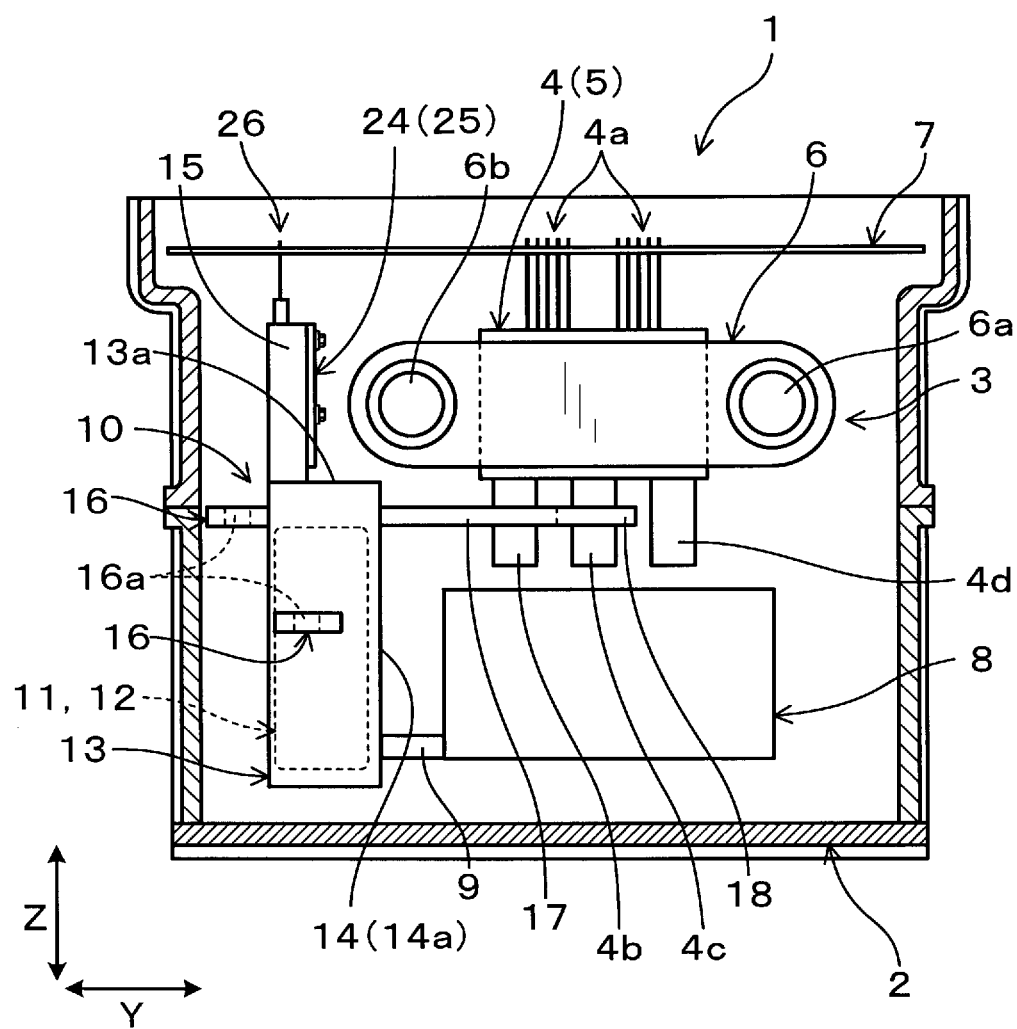
FIG. 1 is a diagram showing an entire configuration of a power conversion device according to a first embodiment.

The inventor of the present disclosure has studied the following technique related to a capacitor device constituting a power conversion device.

As a capacitor device, the one including a filter capacitor and a plurality of smoothing capacitors according to a request on design has been known. In case of this capacitor device, the plurality of smoothing capacitors are not liable to thermally interfere with each other because they have similar heat generation levels in energization. However, since the filter capacitor and the smoothing capacitor have different heat generation levels in energization, there is a problem that a capacitor on a low temperature side is likely to be affected by a capacitor on a high temperature side due to mutual thermal interference. Particularly, like a capacitor device disclosed in Japanese Unexamined Patent Application Publication No. 2014-45035 (JP 2014-45035A), in case of a structure of housing the filter capacitor and the smoothing capacitor together in the capacitor case, a problem of thermal interference is remarkable because the distance between capacitors is small. Thus, when this type of capacitor device having a capacitor case that houses a filter capacitor and a plurality of smoothing capacitors is designed, a structure for preventing thermal interference liable to occur between capacitors in energization is required.

The present disclosure aims to provide a capacitor device capable of preventing thermal interference between a filter capacitor and a plurality of smoothing capacitors.

A capacitor device according to an aspect of the present disclosure is provided in an energization circuit between a power source and a power supply device. The capacitor device includes a filter capacitor, a plurality of smoothing capacitors, and a capacitor case. The filter capacitor removes a noise included in a current input from a power input terminal. The plurality of smoothing capacitors smooth a voltage. The capacitor case houses the filter capacitor and the plurality of smoothing capacitors. A first gap between the filter capacitor and a smoothing capacitor provided at a position closest to the filter capacitor among the plurality of smoothing capacitors is configured to be larger than a second gap between two smoothing capacitors adjacent to each other among the plurality of smoothing capacitors.

In the above-described capacitor device, the first gap between the filter capacitor and the plurality of smoothing capacitors is a gap having a predetermined distance between the filter capacitor and a smoothing capacitor provided at a position closest to the filter capacitor. The first gap is set to be relatively larger than the second gap between two smoothing capacitors adjacent to each other, and thereby the filter capacitor can be separated from each of the plurality of smoothing capacitors. With this, the filter capacitor and the plurality of smoothing capacitors having different heat generation levels in energization are not liable to thermally interfere with each other.

As described above, according to the above aspect, a capacitor device capable of preventing thermal interference between a filter capacitor and a plurality of smoothing capacitors can be provided. Note that, codes in parentheses described in claims and the solution to problem indicate correspondence relation with concrete measures described in embodiments described below, and do not limit a technical scope of the present disclosure.

The above and other objectives, features and advantages of the present disclosure will be made more clear by the following detailed description, given referring to the appended drawings.

Embodiments relating to a capacitor device will be described below with reference to drawings.

It should be noted that in drawings of the present specification, where not specifically mentioned, a first direction which is a lamination direction of a plurality of semiconductor modules constituting a semiconductor lamination unit is indicated by an arrow X, a second direction orthogonal to the first direction X is indicated by an arrow Y, and a third direction (also referred to as a "height direction") orthogonal to both the first direction X and the second direction Y is indicated by an arrow Z.

(First Embodiment)

As shown in FIG. 1, a power conversion device 1 according to a first embodiment houses, in a case 2, a semiconductor lamination unit 3, a control circuit substrate 7, a reactor 8, a capacitor device 10, and a discharge resistor substrate 24. The case 2 is made of a metallic material having good thermal conductivity, so-called "thermal dissipation".

The power conversion device 1 is mounted, for example, on an electric vehicle, a hybrid vehicle, or the like and used as an inverter that converts DC power source power into AC power necessary for drive of a driving motor.

The semiconductor lamination unit 3 includes a plurality of semiconductor modules 4 each incorporating a semiconductor element 5 in a main body portion and a cooler having a plurality of cooling pipes 6. In the semiconductor lamination unit 3, the plurality of semiconductor modules 4 and the plurality of cooling pipes 6 are alternately laminated and arranged in the first direction X. That is, each semiconductor module 4 is sandwiched between two cooling pipes 6 from both side surfaces in the first direction X. The cooling pipe 6 has a first end communicated with a cooling medium inflow pipe 6a and a second end communicated with a cooling medium outflow pipe 6b.

The semiconductor module 4 has a plurality of control terminals 4a, a positive electrode terminal 4b, a negative electrode terminal 4c, and an AC terminal 4d. Each of the plurality of control terminals 4a protrudes upward from a main body portion in the third direction Z. Each of the positive electrode terminal 4b, the negative electrode terminal 4c, and the AC terminal 4d protrudes downward from the main body portion in the third direction Z.

The control circuit substrate 7 is electrically connected to the plurality of control terminals 4a of each of the plurality of semiconductor modules 4. The control circuit substrate 7 is configured to control a switching operation (on/off operation) of the semiconductor element 5 incorporated in the semiconductor module 4 in order to convert DC power supplied to the semiconductor module 4 into AC power. As the semiconductor element 5, typically, an arbitrary switching element, such as an IGBT (that is, insulated gate bipolar transistor) or a MOSFET (that is, metal-oxide semiconductor field-effect transistor) is used.

The reactor 8 is disposed below the semiconductor lamination unit 3. The reactor 8 has a coil (also referred to as "inductor") that generates a magnetic flux by energization from an energization part 9 and has a function of converting electric energy into magnetic energy by using this coil.

The capacitor device 10 is provided in an energization circuit (later-described inverter circuit 30) between a power source (later-described battery B) and the semiconductor module 4 as a power supply device. The capacitor device 10 includes a filter capacitor 11, a plurality of smoothing capacitors 12, and a capacitor case 13 that houses the filter capacitor 11 and the plurality of smoothing capacitors 12. The filter capacitor 11 and the smoothing capacitor 12 are composed of similar capacitor elements. The capacitor device 10 is also referred to as a "capacitor module" or a "capacitor assembly".

The capacitor case 13 is a bottomed box-shaped case having a housing opening 14 and configured to be fixed to the case 2 via a plurality of fixing parts 16. The fixing part 16 is provided with a through hole 16a for inserting a shaft part of a fastening member (not shown). Thus, the fixing part 16 is a fixing point by fastening and fixing. The capacitors 11, 12 are sealed with potting resin in a state of being housed through the housing opening 14 of the capacitor case 13.

For supplying electric power to the semiconductor module 4, the capacitor device 10 includes a positive electrode bus bar 17 and a negative electrode bus bar 18 that extend from the capacitor case 13 along the second direction Y perpendicular to the opening surface 14a of the housing opening 14 to electrically connect the capacitors 11, 12 to the semiconductor module 4. Each of the positive electrode bus bar 17 and the negative electrode bus bar 18 is configured as a plate member that extends from the smoothing capacitor 12 through the housing opening 14 of the capacitor case 13. The positive electrode bus bar 17 is joined to the positive electrode terminal 4b protruding from the semiconductor module 4 by welding or the like. Similarly, the negative electrode bus bar 18 is joined to the negative electrode terminal 4c protruding from the semiconductor module 4 by welding or the like.

The discharge resistor substrate 24 is provided with a discharge resistor 25 for discharging electric charge accumulated in the capacitor device 10. The discharge resistor substrate 24 is provided at a position deviated from a projection surface in the second direction Y of the housing opening 14 of the capacitor case 13, in other words, separated from the opening surface 14a of the housing opening 14 of the capacitor case 13. The discharge resistor substrate 24 is provided at a position outside of a side wall 13a surrounding the housing opening 14 of the capacitor case 13. Specifically, the discharge resistor substrate 24 is provided in a substrate fixing part 15 that extends from the side wall 13a surrounding the housing opening 14 of the capacitor case 13. This makes it possible to prevent heat generated from the discharge resistor 25 as a heating element from thermally interfering with the capacitors 11, 12 housed in the capacitor case 13.

The discharge resistor substrate 24 is configured to extend along the opening surface 14a of the housing opening 14 of the capacitor case 13. At that time, an extending surface of the discharge resistor substrate 24 is parallel to the opening surface 14a of the housing opening 14 and is perpendicular to the side wall 13a surrounding the housing opening 14 of the capacitor case 13. The opening surface 14a can be also said to be a potting surface formed by potting resin.

The capacitor device 10 includes a voltage detection terminal 26 for detecting voltages of the filter capacitor 11 and the plurality of smoothing capacitors 12. The voltage detection terminal 26 protrudes upward in the third direction Z from the substrate fixing part 15 provided in the capacitor case 13 and extends between the discharge resistor substrate 24 and the control circuit substrate 7. That is, the voltage detection terminal 26 is configured to protrude from the capacitor case 13 in which the capacitors 11, 12 are housed. Thereby, the voltage detection terminal 26 is not liable to be affected by electromagnetic noise from the capacitors 11, 12.

Here, the configuration of each part and a circuit configuration of the above-described power conversion device 1 will be described in more detail.

Figure 2:
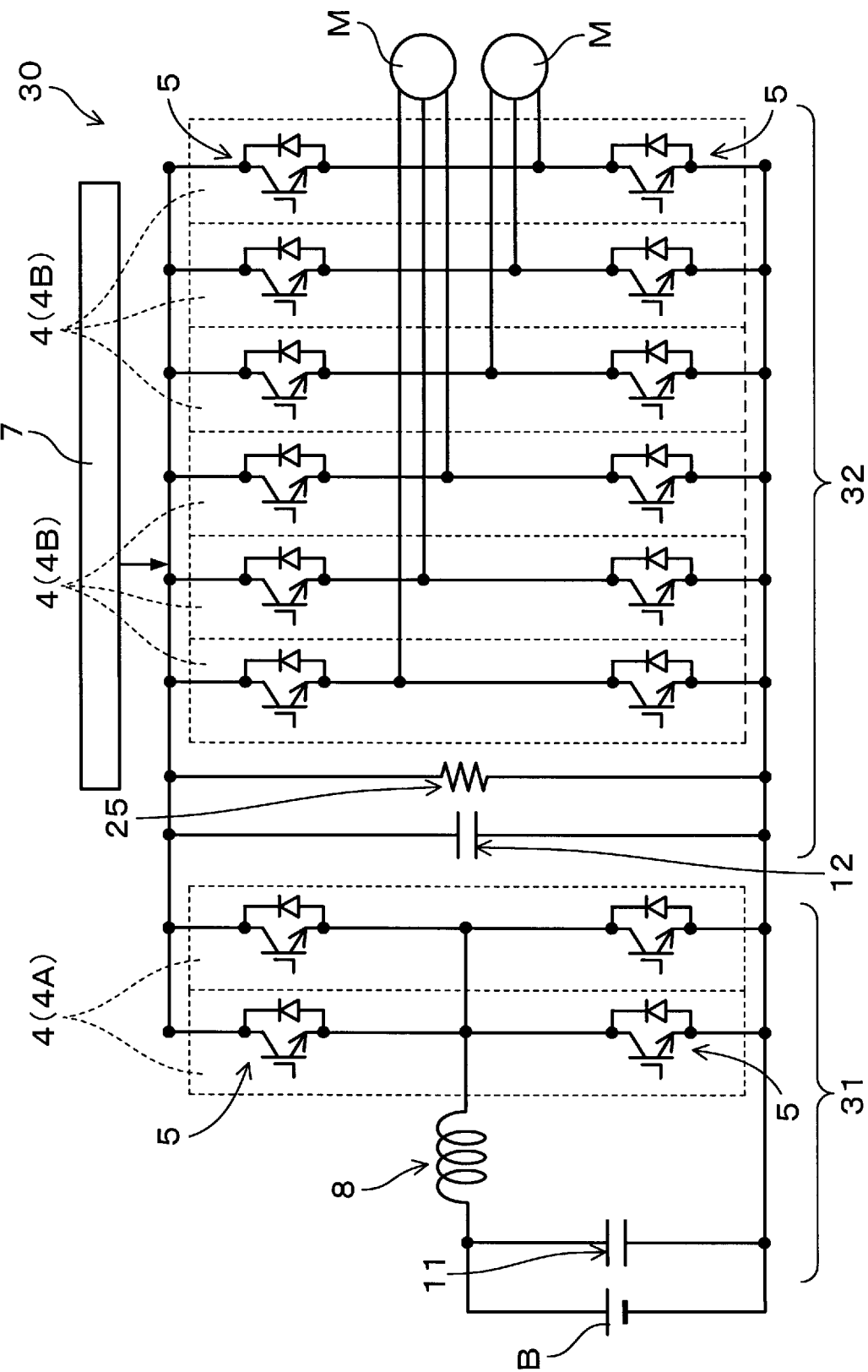
FIG. 2 is an inverter circuit diagram of the power conversion device of FIG. 1.

As shown in FIG. 2, in the inverter circuit 30 of the power conversion device 1, switching operations (on/off operations) of the semiconductor elements 5 incorporated in each of the plurality of semiconductor modules 4 are controlled by the control circuit substrate 7, and the DC power of the battery B is converted into AC power. The plurality of semiconductor modules 4 are classified into a semiconductor module 4A and a semiconductor module 4B.

In the present embodiment, the reactor 8, the filter capacitor 11, and the semiconductor module 4A constitute a booster 31 of the inverter circuit 30. The booster 31 has a function of boosting a voltage of the battery B. The filter capacitor 11 is a capacitor for removing a noise (noise current) included in a current input from one pair of power input terminals 20 to be described below. The filter capacitor 11 is provided electrically on an upstream side than the plurality of smoothing capacitors 12 with respect to a current flow from the battery B.

Meanwhile, the capacitor 12 and the semiconductor module 4B constitute a converter 32 of the inverter circuit 30. The converter 32 has a function of converting DC power after boosted in the booster 31 into three-phase (that is, U phase, V phase, W phase) AC power. The capacitor 12 is a capacitor for smoothing a voltage after boosted in the booster 31. A three-phase AC motor M for vehicle running is driven by the AC power obtained by the converter 32.

In addition, a discharge resistor 25 is provided in parallel with the filter capacitor 11 and the smoothing capacitor 12. Thereby, internal charges of the capacitors 11, 12 are discharged through the discharge resistor 25, for example, when the power conversion device 1 is stopped.

Note that, the number and arrangement of the respective elements constituting the above inverter circuit 30 are not limited to those shown in FIG. 2 and can be changed appropriately as necessary.

Figure 3:
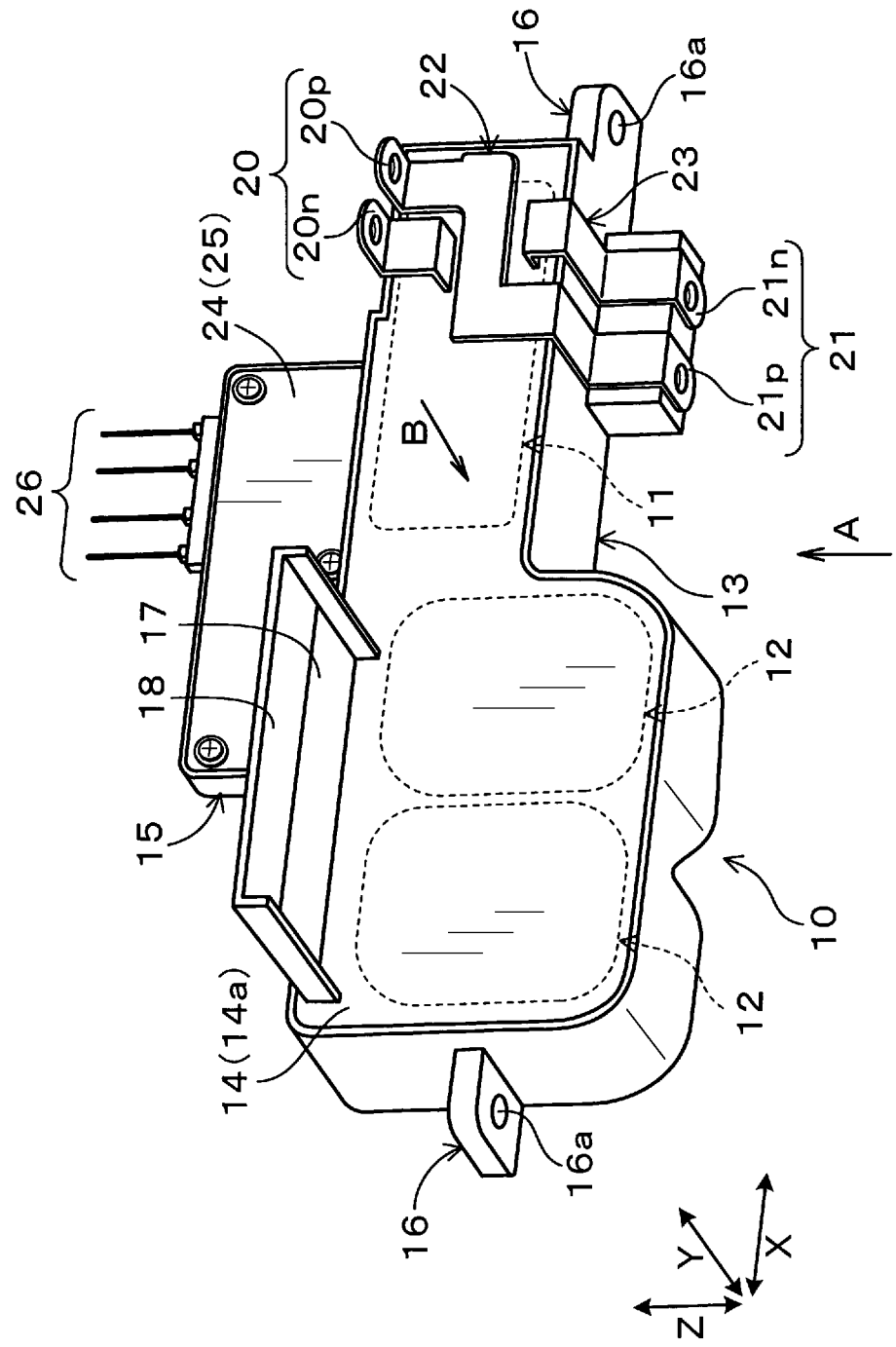
FIG. 3 is a perspective diagram of a capacitor device of the first embodiment.

As shown in FIG. 3, the capacitor case 13 of the capacitor device 10 is configured so that the first direction X is a longitudinal direction. The filter capacitor 11 and two smoothing capacitors 12 are housed in the capacitor case 13 in a state of being juxtaposed in the first direction X.

Further, the capacitor device 10 includes one pair of power input terminals 20 electrically connected to the battery B and one pair of power supply terminals 21 for supplying electric power input to the pair of power input terminals 20 to another electronic device including a reactor 8.

A positive electrode-side terminal 20p, which is one of the pair of power input terminals 20, is composed of a first end portion 22a of a bent plate-like bus bar 22. In addition, a positive electrode-side terminal 21p, which is one of the pair of power supply terminals 21, is composed of a second end portion 22b of the bus bar 22.

A negative electrode-side terminal 20n, which is the other of the pair of power input terminals 20, is composed of a first end portion 23a of a bent plate-like bus bar 23. In addition, a negative electrode-side terminal 21n, which is the other of the pair of power supply terminals 21, is composed of a second end portion 23b of the bus bar 23. In the bus bar 23, an area between the first end portion 23a and the second end portion 23b is buried in the potting resin of the capacitor case 13.

The positive electrode-side terminal 20p and the negative electrode-side terminal 20n, which are the pair of power input terminals 20, are electrically connected to a positive electrode-side and a negative electrode-side of the external battery B (refer to FIG. 2), respectively, and electrically connected to the positive electrode-side terminal 21p and the negative electrode-side terminal 21n, respectively. The positive electrode-side terminal 21p and the negative electrode-side terminal 21n, which are the pair of power supply terminals 21, are electrically connected to the reactor 8 and configured to be capable of supplying electric power input to the pair of power input terminals 20 to the reactor 8.

The pair of power input terminals 20 and the pair of power supply terminals 21 are electrically connected to each of the filter capacitor 11 and the plurality of smoothing capacitors 12 and are provided at positions closer to the filter capacitor 11 than the plurality of smoothing capacitors 12.

Here, as described above, the filter capacitor 11 is electrically provided on an upstream side than the plurality of smoothing capacitors 12. Hence, providing the pair of power input terminals 20 and the pair of power supply terminals 21 closer to the filter capacitor 11 makes it possible to suppress an energization path to the filter capacitor 11 to be short. On the other hand, if the pair of power input terminals 20 and the pair of power supply terminals 21 are made close to the plurality of smoothing capacitors 12, the energization path to the filter capacitor 11 becomes long, and there may arise a problem that an elongated portion of the energization path serves as a heater in energization to increase a heat generation amount.

Figure 4:
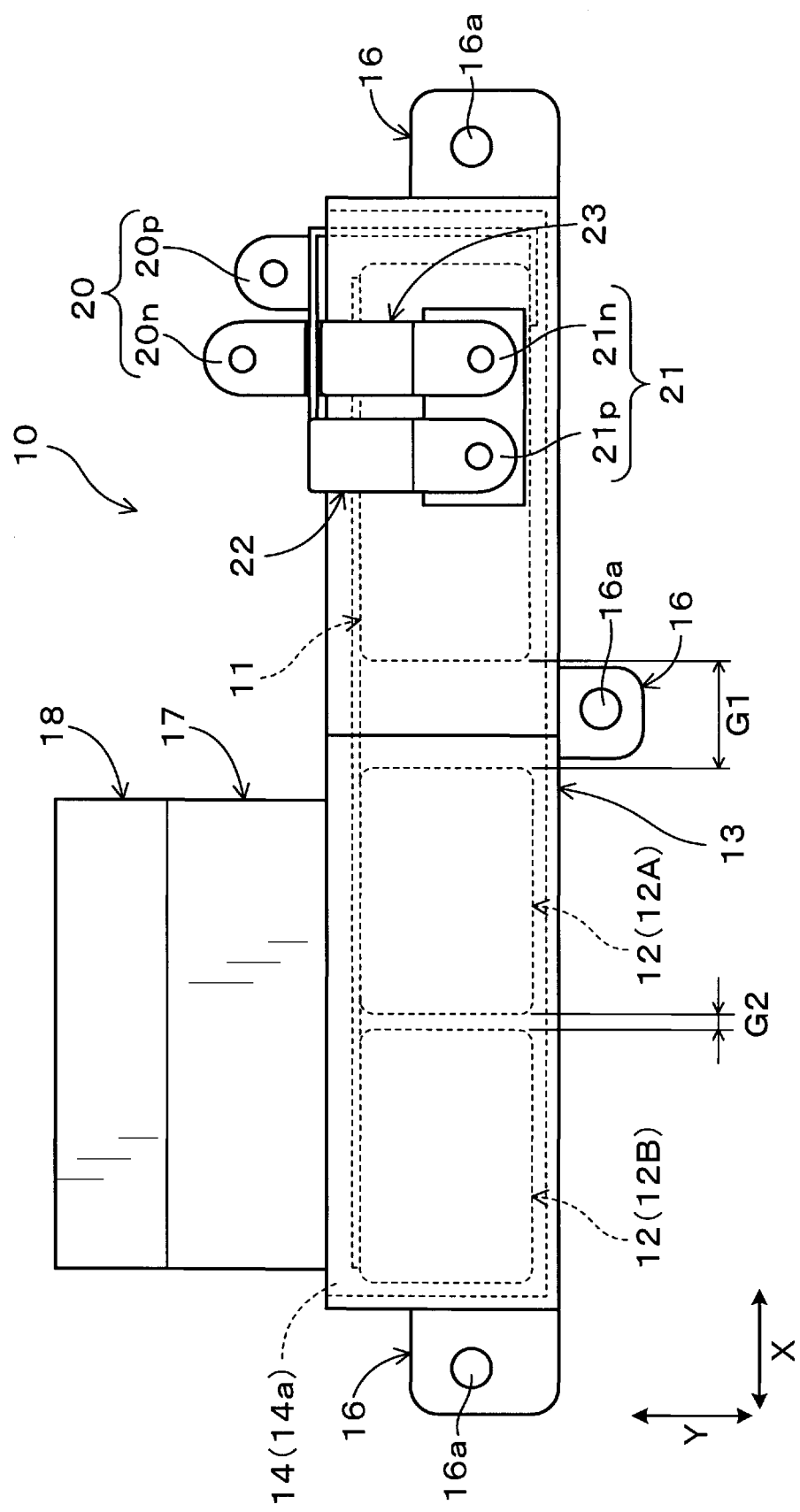
FIG. 4 is a diagram when

As shown in FIG. 4, in the capacitor case 13, one of three fixing parts 16 any of which is fixed to the case 2 is provided between the filter capacitor 11 and the plurality of (two, in the present embodiment) smoothing capacitors 12. This makes it possible to transfer the heat generated in the capacitors 11, 12 in energization to the case 2 of high heat conductivity through the fixing part 16 and cool the capacitor device 10.

Meanwhile, two smoothing capacitors 12 are not liable to thermally interfere with each other because they have similar heat generation levels in energization, but since the filter capacitor 11 and the smoothing capacitor 12 have different heat generation levels in energization, a capacitor on a cool temperature side is likely to be affected by a capacitor on a high temperature side due to mutual thermal interference.

Figure 5:
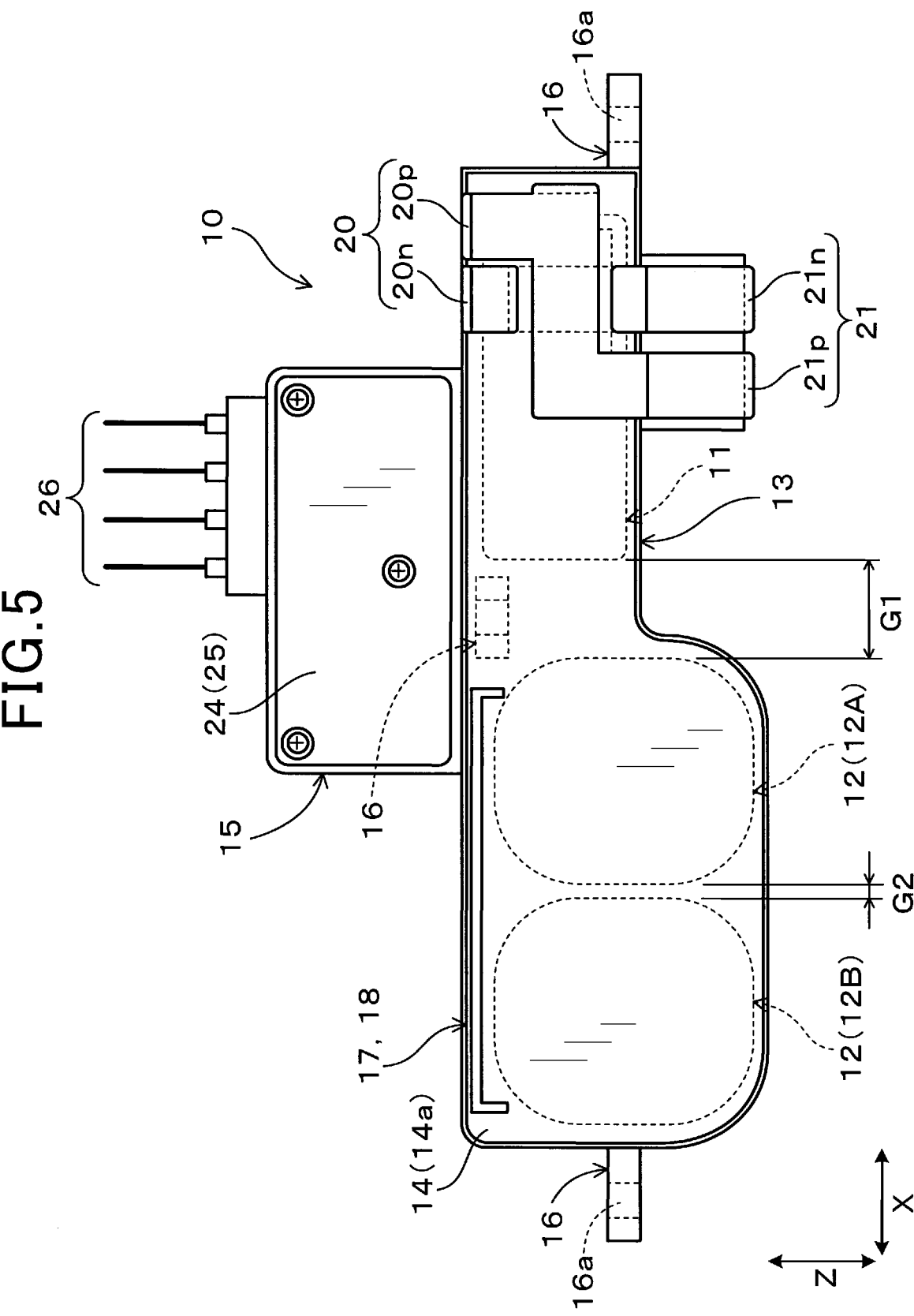
FIG. 5 is a diagram when

Thus, the capacitor device 10 of the present embodiment is, as shown in FIGS. 4 and 5, configured so that a first gap G1 (first distance) between the filter capacitor 11 and a smoothing capacitor 12A provided at a position closest to the filter capacitor 11 among two smoothing capacitors 12 is larger than a second gap G2 (second distance) between the two smoothing capacitors 12.

According to the capacitor device 10, the filter capacitor 11 can be separated from each of the two smoothing capacitors 12A, 12B by making the first gap G1 relatively larger than the second gap G2. Thereby, the thermal interference is not liable to be generated between the filter capacitor 11 and the two smoothing capacitors 12A, 12B having the different heat generation levels in energization.

Therefore, according to the first embodiment, the capacitor device 10 capable of preventing thermal interference between the filter capacitor 11 and the two smoothing capacitors 12A, 12B can be provided.

In addition, according to the capacitor device 10, thermal interference can be prevented in consideration of the difference in a heat generation amount and resistance to heat between the filter capacitor 11 and the smoothing capacitor 12. Further, noise superimposition of the filter capacitor 11 and the smoothing capacitor 12 can be prevented. Furthermore, robustness of insulation is improved because a potential difference between the filter capacitor 11 and the smoothing capacitor 12 is different.

Another embodiment related to the first embodiment described above will be described below with reference to a drawing. In another embodiment, the same element as the element of the first embodiment will be attached with the same reference numerals and the description of the same element will be omitted.

(Second Embodiment)

A capacitor device 110 of a second embodiment is different from the capacitor device 10 of the first embodiment in the number of smoothing capacitors 12 housed in the capacitor case 13. Other configurations are the same as those of the first embodiment.

Figure 6:
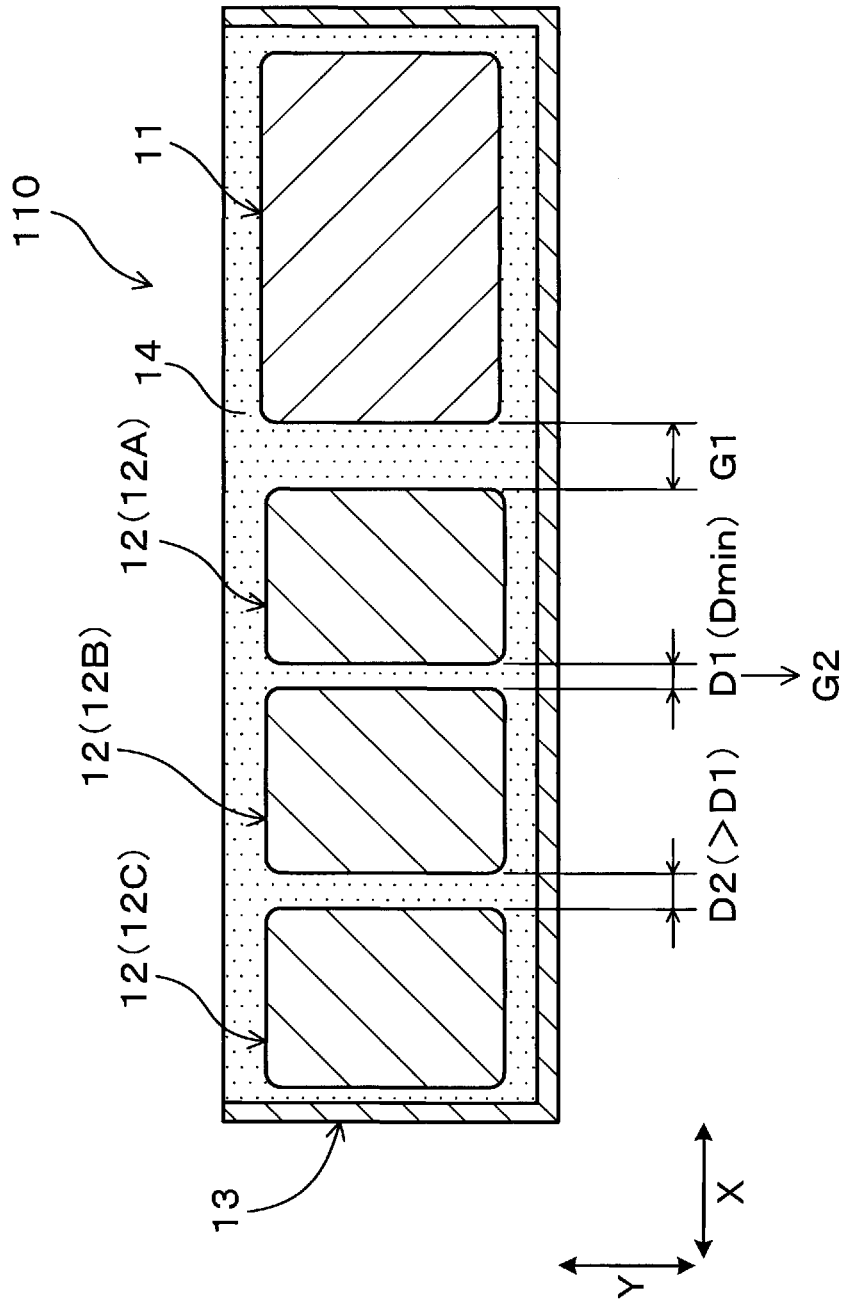
FIG. 6 is a cross-sectional diagram schematically showing an arrangement of a filter capacitor and a plurality of smoothing capacitors housed in a capacitor case of a capacitor device of a second embodiment.

As shown in FIG. 6, a capacitor case 13 of the capacitor device 110 houses three smoothing capacitors 12. Note that, FIG. 6 shows the capacitor case 13 in a simplified manner.

The three smoothing capacitors 12 are juxtaposed in the first direction X at two distances D1, D2. That is, when the three smoothing capacitors 12 are a first smoothing capacitor 12A, a second smoothing capacitor 12B, and a third smoothing capacitor 12C in order from nearest to the filter capacitor 11, a distance between the first smoothing capacitor 12A and the second smoothing capacitor 12B adjacent to each other is D1, and a distance between the second smoothing capacitor 12B and the third smoothing capacitor 12C adjacent to each other is D2.

Here, a value of the smaller one of the two distances D1, D2, that is, the minimum value Dmin can be set to a value of the second gap G2. In case of FIG. 6, since the distance D1 is smaller than the distance D2 and is the minimum value Dmin, the distance D1 is the second gap G2.

The capacitor device 110 is configured so that the first gap G1 between the filter capacitor 11 and the smoothing capacitor 12A provided at a position closest to the filter capacitor 11 among the three smoothing capacitors 12A, 12B, 12C is larger than the second gap G2 that is the distance D1 between the first smoothing capacitor 12A and the second smoothing capacitor 12B adjacent to each other.

Except in a case where there is a difference between the distance D1 and the distance D2 due to a minute tolerance or the like, when the distance D1 is equal to the distance D2, both the two distances D1, D2 are the minimum value Dmin and correspond to the second gap G2.

According to the capacitor device 110 of the second embodiment, thermal interference between the filter capacitor 11 and three smoothing capacitors 12 can be prevented. Furthermore, working effects similar to those of the first embodiment can be exerted.

The present disclosure is not limited only to typical embodiments described above, and various applications and variations can be considered as long as not deviating from the purpose of the present disclosure. For example, the following respective modes to which above-described embodiments are applied can be also implemented.

In the above-described embodiments, the capacitor device 10, 110 in which one filter capacitor 11 and two or three smoothing capacitors 12 are housed in the capacitor case 13 is exemplified, but the numbers of the filter capacitor 11 and the smoothing capacitors 12 are not limited to these and can be appropriately changed as necessary. For example, the number of the smoothing capacitors 12 can be also changed to four or more.

In the above-described embodiments, the capacitor device 10, 110 provided in the inverter circuit 30 between the battery B and the semiconductor module 4 is exemplified, but the structure of the capacitor device 10, 110 can be applied to the structure of a capacitor device provided in an energization circuit between the power source and various power supply devices.

What is claimed is:

1. A capacitor device provided in an energization circuit between a power source and a power supply device, the capacitor device comprising:
    a filter capacitor for removing a noise included in a current input from a power input terminal;
    a plurality of smoothing capacitors for smoothing a voltage; and
    a capacitor case that houses the filter capacitor and the plurality of smoothing capacitors, wherein
    a first gap between the filter capacitor and a smoothing capacitor provided at a position closest to the filter capacitor among the plurality of smoothing capacitors is configured to be larger than a second gap between two smoothing capacitors adjacent to each other among the plurality of smoothing capacitors.

2. The capacitor device according to claim 1, wherein
    three or more smoothing capacitors are arranged at a plurality of distances as the plurality of smoothing capacitors, and a minimum value among the plurality of distances is set to a value of the second gap.

3. The capacitor device according to claim 1, further comprising
    a discharge resistor substrate provided with a discharge resistor, wherein
    the discharge resistor substrate is provided at a position outside of a side wall surrounding of a housing opening of the capacitor case.

4. The capacitor device according to claim 3, wherein
    the discharge resistor substrate is configured to extend along an opening surface of the housing opening on an outside of the side wall surrounding the housing opening of the capacitor case.

5. The capacitor device according to claim 1, further comprising
    a voltage detection terminal for detecting voltages of the filter capacitor and the plurality of smoothing capacitors, wherein
    the voltage detection terminal is configured to protrude from the capacitor case.

6. The capacitor device according to claim 1, further comprising
    a power supply terminal for supplying an electric power input to the power input terminal to another electronic device, wherein
    the filter capacitor is provided on an electrically upstream side than the plurality of smoothing capacitors with respect to a current flow from the power source, and
    any of the power input terminal and the power supply terminal is provided at a position closer to the filter capacitor than the plurality of smoothing capacitors.

7. The capacitor device according to claim 1, wherein
    a fixing part for fixing the capacitor case is provided between the filter capacitor and the plurality of smoothing capacitors.

8. The capacitor device according to claim 1, further comprising
    bus bars for supplying an electric power to a semiconductor module as the power supply device.

* * * * *